US009123347B2

(12) United States Patent
Kim et al.

(10) Patent No.: US 9,123,347 B2
(45) Date of Patent: Sep. 1, 2015

(54) APPARATUS AND METHOD FOR ELIMINATING NOISE

(75) Inventors: Hong Kook Kim, Gwangju (KR); Ji Hun Park, Gwangju (KR); Woo Kyeong Seong, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 492 days.

(21) Appl. No.: 13/598,112

(22) Filed: Aug. 29, 2012

(65) Prior Publication Data

US 2013/0054234 A1 Feb. 28, 2013

(30) Foreign Application Priority Data

Aug. 30, 2011 (KR) ........................ 10-2011-0087413

(51) Int. Cl.
*G10L 15/20* (2006.01)
*G10L 21/0208* (2013.01)
*G10L 25/87* (2013.01)
*G10L 25/93* (2013.01)

(52) U.S. Cl.
CPC ............. *G10L 21/0208* (2013.01); *G10L 25/87* (2013.01); *G10L 25/93* (2013.01)

(58) Field of Classification Search
CPC ...... G10L 15/02; G10L 21/0208; G10L 29/93
USPC .......................................... 704/208, 233, 226
See application file for complete search history.

(56) References Cited

U.S. PATENT DOCUMENTS

| | | | | |
|---|---|---|---|---|
| 5,204,906 | A * | 4/1993 | Nohara et al. | 704/207 |
| 5,774,846 | A * | 6/1998 | Morii | 704/232 |
| 6,006,175 | A * | 12/1999 | Holzrichter | 704/208 |
| 6,691,090 | B1 * | 2/2004 | Laurila et al. | 704/250 |
| 7,233,899 | B2 * | 6/2007 | Fain et al. | 704/251 |
| 2003/0055646 | A1 * | 3/2003 | Yoshioka et al. | 704/258 |
| 2003/0065506 | A1 * | 4/2003 | Adut | 704/207 |
| 2003/0105540 | A1 * | 6/2003 | Debail | 700/94 |
| 2003/0158734 | A1 * | 8/2003 | Cruickshank | 704/260 |
| 2006/0212296 | A1 * | 9/2006 | Espy-Wilson et al. | 704/254 |
| 2007/0078649 | A1 * | 4/2007 | Hetherington et al. | 704/226 |
| 2007/0288238 | A1 * | 12/2007 | Hetherington et al. | 704/248 |
| 2009/0252350 | A1 * | 10/2009 | Seguin | 381/109 |
| 2011/0125491 | A1 * | 5/2011 | Alves et al. | 704/207 |
| 2012/0173234 | A1 * | 7/2012 | Fujimoto et al. | 704/233 |
| 2013/0041658 | A1 * | 2/2013 | Bradley et al. | 704/208 |
| 2013/0144613 | A1 * | 6/2013 | Hardwick | 704/208 |

* cited by examiner

*Primary Examiner* — Jakieda Jackson
(74) *Attorney, Agent, or Firm* — Nath, Goldberg & Meyer; Jerald L. Meyer

(57) ABSTRACT

Provided are an apparatus and method for eliminating noise. The method includes: detecting a speech section from a noise speech signal including a noise signal; separating the speech section into a consonant section and a vowel section on the basis of a VOP at the speech section; calculating a transfer function of a filter for eliminating the noise signal to allow the degree of noise elimination to be different in the consonant section and the vowel section; and eliminating the noise signal from the noise speech signal on the basis of the transfer function.

14 Claims, 10 Drawing Sheets

100

(a)

(b)

APPARATUS AND METHOD FOR ELIMINATING NOISE

CROSS-REFERENCE TO RELATED APPLICATION

This application claims priority to Korean Patent Application No. 10-2011-0087413 filed on 30 Aug. 2011 and all the benefits accruing therefrom under 35 U.S.C. §119, the contents of which are incorporated by reference in their entirety.

BACKGROUND

The present invention disclosed herein relates to an apparatus and method for eliminating noise. In more detail, the present invention disclosed herein relates to an apparatus and method for eliminating noise to recognize speech in a noisy environment.

In the case of the wiener filter (i.e. a typical noise processing technique used for speech recognition in a noisy environment), it detects a speech section and a non-speech section (i.e. a noise section) and eliminates noise in the speech section on the basis of frequency characteristics of the non-speech section. However, this technique uses only a speech section and a non-speech section in order to estimate frequency characteristics of noise. That is, noise is eliminated by applying the same transfer function to a speech section regardless of consonants and vowels. However, this may cause the distortion of a consonant section.

SUMMARY

The present invention provides an apparatus and method for eliminating noise, which estimate noise components by detecting a speech section and a non-speech section and detect a consonant section and a vowel section from the speech section in order to apply a transfer function appropriate for each section.

In accordance with an exemplary embodiment of the present invention, a noise eliminating apparatus includes: a speech section detecting unit configured to detect a speech section from a noise speech signal including a noise signal; a speech section separating unit configured to separate the speech section into a consonant section and a vowel section on the basis of a Vowel Onset Point (VOP) in the speech section; a filter transfer function calculating unit configured to calculate a transfer function of a filter for eliminating the noise signal in order to allow the degree of noise elimination in the consonant section and the vowel section to be different; and a noise eliminating unit configured to eliminate the noise signal from the noise speech signal on the basis of the transfer function.

The filter transfer function calculating unit may calculate the transfer function by allowing the degree of noise elimination in the consonant section to be less than that in the vowel section.

The speech section detecting unit may compare a likelihood ratio of a speech probability to a non-speech probability in a first frequency with a speech section feature average value in at least two frequencies including the first frequency at each signal frame divided from the noise speech signal, in order to detect the speech section.

The speech section detecting unit may include: a posteriori Signal-to-Noise Ratio (SNR) calculating unit configured to calculate a posteriori SNR by using a frequency component in a first signal frame; a priori SNR estimating unit configured to estimate a priori SNR by using at least one of the spectrum density of a noise signal at a second signal frame prior to the first signal frame, the spectrum density of a speech signal in the second signal frame, and the posteriori SNR; a likelihood ratio calculating unit configured to calculate a likelihood ratio with respect to each frequency included in the at least two frequencies by using the posteriori SNR and the priori SNR; a speech section feature value calculating unit configured to calculate the speech section feature average value by averaging the sum of likelihood ratios for each frequency; and a speech section determining unit configured to determine the first signal frame as the speech section when one side component including the likelihood ratio with respect to the first frequency is greater than the other side component including the speech section feature average value through an equation that uses the likelihood ratio with respect to the first frequency and the speech section feature average value as a factor.

The apparatus may further include: a VOP detecting unit configured to detect the VOP by analyzing a change pattern of a Linear Predictive Coding (LPC) remaining signal.

The VOP detecting unit may include: a noise speech signal dividing unit configured to divide the noise speech signal into overlapping signal frames; an LPC coefficient estimating unit configured to estimate an LPC coefficient on the basis of autocorrelation according to the signal frames; an LPC remaining signal extracting unit configured to extract the LPC remaining signal on the basis of the LPC coefficient; an LPC remaining signal smoothing unit configured to smooth the extracted LPC remaining signal; a change pattern analyzing unit configured to analyze a change pattern of a smoothed LPC remaining signal in order to extract a feature corresponding to a predetermined condition; and a feature utilizing unit configured to detect the VOP on the basis of the feature.

The filter transfer function calculating unit may include: an initial transfer function calculating configured to calculate an initial transfer function by estimating the priori SNR at a current signal frame when calculating the initial transfer function by using the current signal frame extracted from a noise speech signal; and a final transfer function calculating unit configured to calculate a final transfer function as a transfer function of the filter by updating a previously-calculated transfer function in consideration of a critical value according to whether a corresponding signal frame corresponds to which one of a consonant section, a vowel section, and a non-speech section, when calculating the final transfer function by using at least one signal frame after the current signal frame.

The noise eliminating apparatus may include: a transfer function converting unit configured to convert the transfer function in order to correspond to an extraction condition used for extracting a predetermined level feature; an impulse response calculating configured to calculate an impulse response in a time zone with respect to the converted transfer function; and an impulse response utilizing unit configured to eliminate the noise signal from the noise speech signal by using the impulse response.

The transfer function converting unit may include: an index calculating unit configured to calculate indices corresponding to a central frequency at each frequency band included in the noise speech signal; a frequency window deriving unit configured to derive frequency windows under a first condition predetermined at the each frequency band on the basis of the indices; and a warped filter coefficient calculating unit configured to calculate a warped filter coefficient under a second condition predetermined based on the frequency windows, and performing the conversion, and the impulse response calculating unit may include: a mirrored impulse response calculating unit configured to perform a number-expansion operation on an initial impulse response obtained using the warped filter coefficient in order to calculate a mirrored impulse response; a causal impulse response calculating unit configured to calculate a causal impulse response based on the mirrored impulse response according to a frequency band number relating to the condition; a truncated causal impulse response calculating unit configured to calculate a truncated causal impulse response on the basis of the causal impulse response; and a final impulse response calculating unit configured to calculate an impulse response in the time zone as a final impulse response on the basis of the truncated causal impulse response and a Hanning window.

In accordance with another exemplary embodiment of the present invention, a method of eliminating noise includes: detecting a speech section from a noise speech signal including a noise signal; separating the speech section into a consonant section and a vowel section on the basis of a VOP at the speech section; calculating a transfer function of a filter for eliminating the noise signal to allow the degree of noise elimination to be different in the consonant section and the vowel section; and eliminating the noise signal from the noise speech signal on the basis of the transfer function.

The calculating of the filter transfer function may include calculating the transfer function by allowing the degree of noise elimination in the consonant section to be less than that in the vowel section.

The detecting of the speech section may include comparing a likelihood ratio of a speech probability to a non-speech probability in a first frequency with a speech section feature average value in at least two frequencies including the first frequency at each signal frame divided from the noise speech signal, in order to detect the speech section.

The method may further include detecting the VOP by analyzing a change pattern of an LPC remaining signal.

The removing of the noise may include: converting the transfer function in order to correspond to a standard used for extracting a predetermined level feature; calculating an impulse response in a time zone with respect to the converted transfer function; and eliminating the noise signal from the noise speech signal by using the impulse response.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
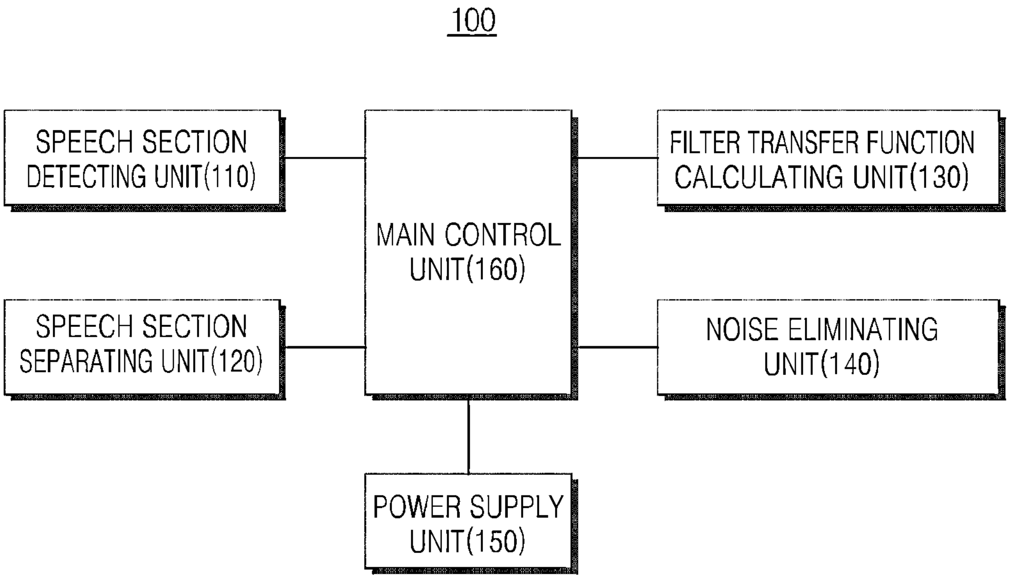
FIG. 1 is a block diagram illustrating a noise eliminating apparatus in accordance with an exemplary embodiment of the present invention.

FIG. 1 is a block diagram illustrating a noise eliminating apparatus in accordance with an exemplary embodiment of the present invention. Referring to FIG. 1, the noise eliminating apparatus 100 includes a speech section detecting unit 110, a speech section separating unit, a filter transfer function calculating unit, a noise eliminating unit 140, a power supply unit 150, and a main control unit 160. The noise eliminating apparatus 100 may be used for recognizing speech.

Unlike foreign language such as English, a consonant plays an important role in delivering the meaning in Korean language. For example, the meaning of the word '아빠' may not be easily guessed through a list of the vowels 'ㅏㅏ', but may be roughly guessed through a list of the consonants 'ㅇㅃ'. The above is one example illustrating the importance of consonants in Korean language. That is, the importance of consonants is significantly critical in Korean speech recognition. However, consonants have less energy than vowels and their frequency components are similar to those of noise. Due to this, when background noise is eliminated by using a frequency characteristic difference between speech and the background noise, distortion may occur in a consonant section. This may further affect the deterioration of speech recognition performance than the distortion in a consonant section.

The present invention suggests a consonant/vowel dependent wiener filter for speech recognition in a noisy environment. This filter is a noise eliminating apparatus that minimizes distortion in a consonant section and, on the basis of this, improves speech recognition performance in a noisy environment by designing and applying a wiener filter transfer function proper for each of a consonant section and a vowel section. For this, a speech section for an input noise speech is detected using a Gaussian model based speech section detecting module. In consideration of a change of a Linear Predictive Coding (LPC) remaining signal, a Vowel Onset Point (VOP) is combined with speech section information in order to estimate speech section information having a classified consonant/vowel section. The transfer function of the consonant/vowel section dependent wiener filter is obtained based on the estimated speech interval information. That is, the wiener filter transfer function is designed to make the degree of noise elimination different in a consonant section and a vowel section. Especially, the degree of noise elimination in a consonant interval is designed to be less than that in a vowel section, thereby preventing the consonant section and noise from being eliminated together when the wiener filter is applied. The designed wiener filter is finally applied to an input noise speech, so that an output speech without noise is generated.

The speech section detecting unit 110 performs a function for detecting a speech section from a noise speech signal including a noise signal. The speech section detecting unit 110 detects a speech section on the basis of Gaussian modeling. The speech section separating unit 120 performs a function for separating a speech section into a consonant section and a vowel section on the basis of the VOP in the speech section. The filter transfer function calculating unit 130 performs a function for calculating a transfer function of a filter to eliminate a noise signal in order to make the degree of noise elimination in a consonant section and a vowel section different. The filter transfer function calculating unit 130 calculates a transfer function that allows the degree of noise elimination in a consonant section to be less than that in a vowel section. The noise eliminating unit 140 performs a function for eliminating a noise signal from a noise speech signal on the basis of the transfer function. The power supply unit 150 performs a function for supplying power to each component constituting the noise eliminating apparatus 100. The main control unit 160 performs a function for controlling entire operations of each component constituting the noise eliminating apparatus 100.

Figure 6:
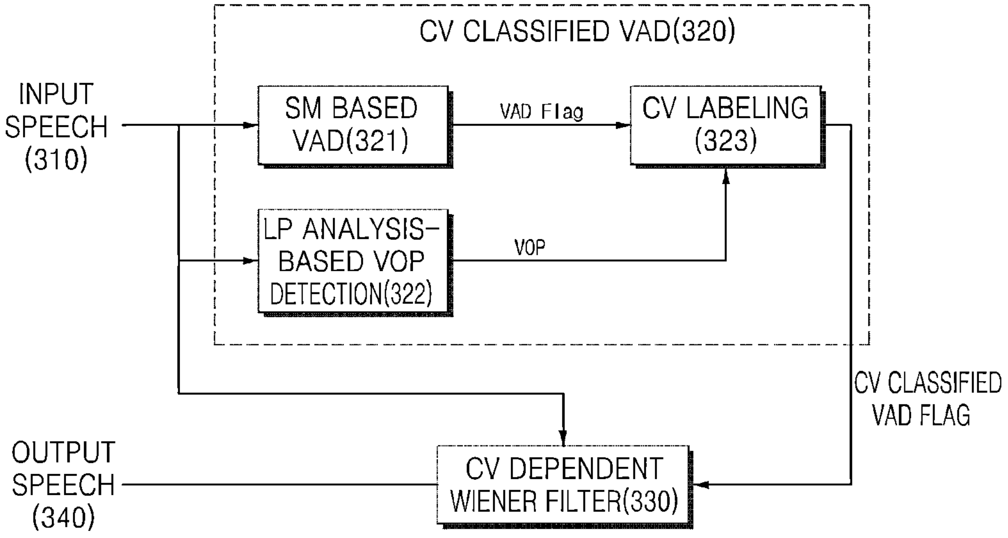
FIG. 6 is a view illustrating a consonant/vowel dependent wiener filter, which is one embodiment of the noise eliminating apparatus of FIG. 1.

FIG. 6 is a view illustrating a consonant/vowel dependent wiener filter, which is one embodiment of the noise eliminating apparatus of FIG. 1. First, a Statistical Model (SM)-based VAD operation 321 detects a speech section from an input speech 310 including noise by using a Gaussian model based speech section detecting module. Additionally, a LP analysis-based Vowel Onset Point (VOP) detection operation 322 detects a VOP in consideration of a change of a Linear Predictive Coding (LPC) remaining signal. Then, a Consonant-Vowel (CV) labeling operation 323 combines the VOP with speech section information in order to estimate speech section information having a separated consonant/vowel section. Then, a CV-dependent wiener filter operation 330 obtains the transfer function of the consonant/vowel section dependent wiener filter on the basis of the estimated speech section information and applies the transfer function to the input speech, thereby outputting the output speech 340 having noise eliminated. A CV-classified VAD operation 320 includes the SM based VAD operation 321, the LP analysis-based VOP detection operation 322, and the CV labeling operation 323, and outputs a CV-classified VAD flag.

Figure 2:
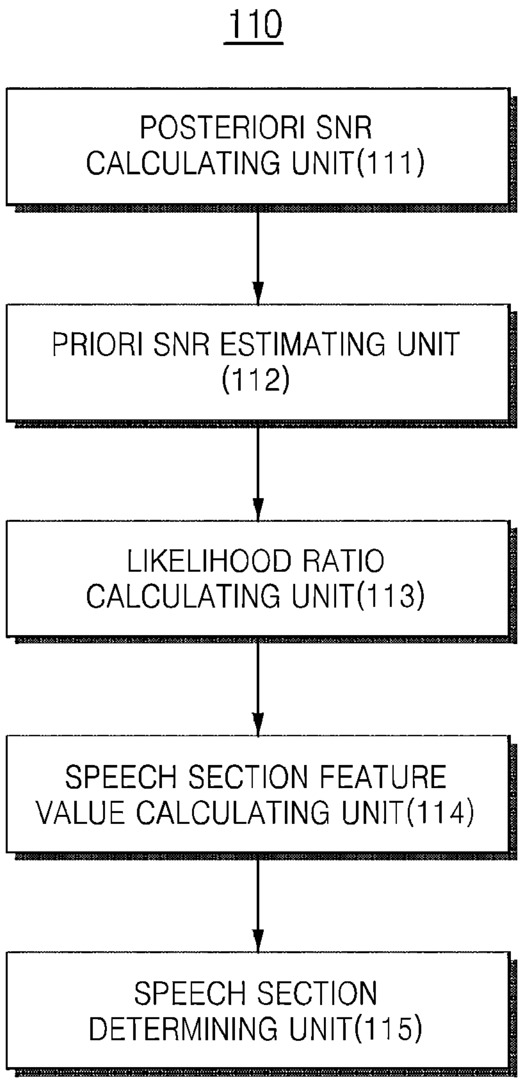
FIG. 2 is a detailed block diagram illustrating a speech section detecting unit in the noise eliminating device of FIG. 1.

FIG. 2 is a block diagram illustrating a speech section detecting unit in the noise eliminating apparatus of FIG. 1. The speech section detecting unit 110 compares a likelihood ratio of a speech probability to a non-speech probability in a first frequency with a speech section feature average value in at least two frequencies including the first frequency at each signal frame divided from a noise speech signal, in order to detect a speech section. Referring to FIG. 2, the speech section detecting unit 110 includes a posteriori Signal-to-Noise Ratio (SNR) calculating unit 111, a priori SNR estimating unit 112, a likelihood ratio calculating unit 113, a speech section feature value calculating unit 114, and a speech section determining unit 115.

The SNR calculating unit 111 performs a function for calculating a posteriori SNR by using a frequency component in the first signal frame. The priori SNR estimating unit 112 performs a function for obtaining a priori SNR by using at least one of the spectral density of a noise signal at the second signal frame prior to the first signal frame, the spectral density of a speech signal in the second signal frame, and a posteriori SNR. The likelihood ratio calculating unit 113 performs a function for calculating a likelihood ratio with respect to each frequency included in at least two frequencies by using the posteriori SNR and the priori SNR. The speech section feature value calculating unit 114 performs a function for calculating a speech section feature average value by averaging the sum of likelihood ratios for each frequency. The speech section determining unit 115 performs a function for determining the first signal frame as the speech section when one side component including a likelihood ratio with respect to the first frequency is greater than the other side component including a speech section feature average value through an equation that uses the likelihood ratio with respect to the first frequency and the speech section feature average value as a factor.

Figure 7:
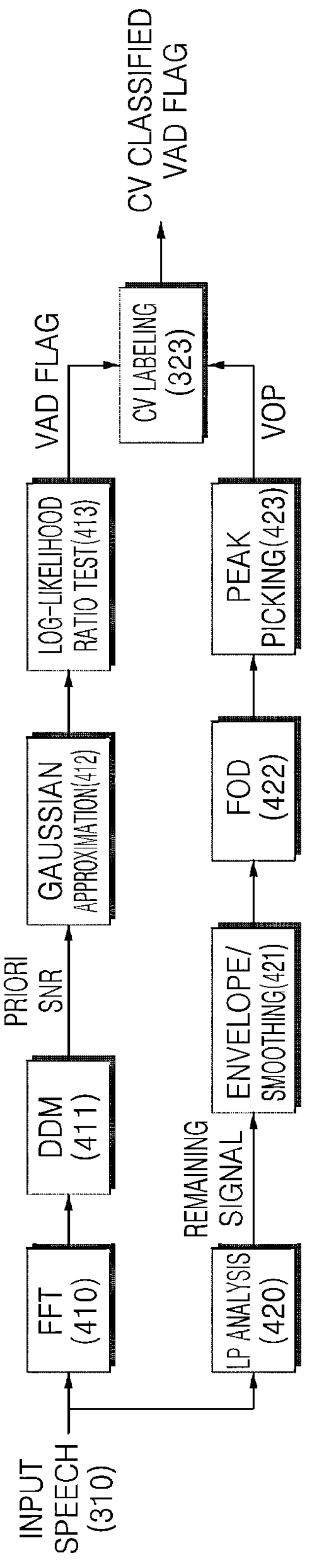
FIG. 7 is a block diagram illustrating a consonant/vowel classified speech section detecting module in the consonant/vowel dependent wiener filter of FIG. 6.

FIG. 7 is a block diagram illustrating a consonant/vowel classified speech section detecting module in the consonant/vowel dependent wiener filter of FIG. 6. In FIG. 7, the upper flows 410 to 413 represent a Gaussian model based speech section detection part and the lower flows 420 to 423 represent a vowel onset section detecting part, which is based on a change of an LPC remaining signal. By combining the result of two modules, a CV labeling operation 323 finally estimates a speech section detection information having a separated consonant/vowel section. First, two hypotheses are assumed in order for Gaussian model based speech section detection. The two hypotheses are expressed in Equation 1.

$$H_0\text{:speech absence } X=N$$

$$H_1\text{:speech presence } X=N+S \qquad \text{[Equation 1]}$$

where S, N, and X are Fast Fourier Transform coefficient vectors for respective speech, noise, and noise speech 310. The present invention assumes a statistical model in which the FFT coefficients of S, N, and X are mutually-independent probability variables. Conditional probability is defined as Equation 2 when H0 and H1 occur in FFT 410.

$$p(X_{k,t}|H_0) = \prod_{k=0}^{L-1} \frac{1}{\pi\lambda_N(k,t)} \exp\left\{-\frac{|X_{k,t}|^2}{\lambda_N(k,t)}\right\} \qquad \text{[Equation 2]}$$

$$p(X_{k,t}|H_1) = \prod_{k=0}^{L-1} \frac{1}{\pi(\lambda_N(k,t)+\lambda_S(k,t))} \exp\left\{-\frac{|X_{k,t}|^2}{\lambda_N(k,t)+\lambda_S(k,t)}\right\}$$

where $\lambda_N$(k,t) and $\lambda_S$(k,t) represent sample values at the k-th frequency and t-th frame of the power spectral density of N and S, respectively, as variances of $_N$(k,t) and $_S$(k,t).

Based on Equation 2, a likelihood ratio of speech and non-speech at the k-th and t-th frame is expressed as Equation 3.

$$\Lambda(k,t) = \frac{p(X_{k,t}|H_1)}{p(X_{k,t}|H_0)} = \frac{1}{1+\eta_{k,t}} \exp\left\{\frac{\gamma_{k,t}\eta_{k,t}}{1+\eta_{k,t}}\right\} \qquad \text{[Equation 3]}$$

where $\rho_{k,t}$ and $\gamma_{k,t}$ represent a priori SNR and a posteriori SNR, respectively, which are obtained through Equation 4.

$$\rho_{k,t}=\lambda_S(k,t)/\lambda_N(k,t)$$

$$\rho_{k,t}=|X_{g,t}|^2/\lambda_N(k,t) \qquad \text{[Equation 4]}$$

where $\lambda_N$(k,t) is a power spectral density value at the k-th frequency and t-th frame of N, which is obtained through Equation 5.

$$\lambda_N(k,t)=X_{k,t}\cdot(X_{k,t})^*. \qquad \text{[Equation 5]}$$

However, $\lambda_S$(k,t) cannot be obtained from parameters given, and thus, the present invention estimates $\rho_{k,t}$ through a priori SNR estimating method (i.e. Decision-Directed (DD) method) in DDM 411. That is, $\rho_{k,t}$ is estimated using Equation 6 below.

$$\hat{\eta}_{k,t} = \alpha\frac{\hat{\lambda}_S(k, t-1)}{\lambda_N(k, t-1)} + (1-\alpha)T[\gamma_{k,t} - 1] \quad \text{[Equation 6]}$$

Here, T[x] is a threshold function. It is defined that if x=0, T[x]=x; if not, T[x]=0. Additionally, a has a value of 0.09 as a weighting factor. $\lambda\hat{}_S$(k,t−1) is a power spectral density estimation value of a speech signal at t−1th frame, which is obtained through Equation 7.

$$\hat{\lambda}_S(k, t-1) = \frac{\hat{\eta}_{k,t-1}}{(1+\hat{\eta}_{k,t-1})} \times |X_{k,t}|^2 \quad \text{[Equation 7]}$$

The priori SNR estimation value and posteriori SNR, obtained through Equations 4 and 6, are substituted into Equation 3 in order to obtain a likelihood ratio Λ(k,t) of speech and non-speech at each frequency and frame in Gaussian Approximation 412. At this point, under the assumption that a likelihood ratio of each frequency is mutually independent, after taking the log function on Λ (k,t), its result is added to an entire frequency band. Then, as shown in Equation 8, a speech section detection feature for the t-th frame is extracted.

$$\log\Lambda_t = \frac{1}{L}\sum_{k=0}^{L-1}\log\Lambda(k, t) \quad \text{[Equation 8]}$$

Lastly, as shown in Equation 9, a speech section and a non-speech section are determined through a Likelihood Ratio Test (LRT) rule in log-likelihood ratio test 413.

$$VAD(t) = \begin{cases} 1, & \text{if } \log A_t > \varepsilon\cdot\mu_t \\ 0, & \text{otherwise} \end{cases} \quad \text{[Equation 9]}$$

Here, e·$\mu_t$ represents a threshold value that determines a speech section, and $\mu_t$ represents an average value of a speech section detection feature with respect to a noise section at the t-th frame. e is a weighting factor for determining a threshold value for a speech section on the basis of $\mu_t$. Herein, e is set to 3. $\mu_t$ at the t-th frame is expressed as Equation 10 below.

$$\mu_t = \begin{cases} \beta\cdot\mu_{t-1} + (1-\beta)\log A_t, & \text{if } t < 10 \text{ or } (\log A_t - \mu_{t-1}) < 0.05 \\ \mu_{t-1}, & \text{otherwise} \end{cases} \quad \text{[Equation 10]}$$

Here, β is a forgetting factor for updating an average value of a speech sector detection feature at a noise section, which is obtained through Equation 11.

$$\beta = \begin{cases} 1 - 1/t, & \text{if } t < 10 \\ 0.97, & \text{otherwise} \end{cases} \quad \text{[Equation 11]}$$

On the basis of the threshold value obtained through Equation 10, a VAD flag is finally obtained with 1 given with respect to a speech frame and 0 given with respect to a silent frame through the determination operation of Equation 9.

Figure 3:
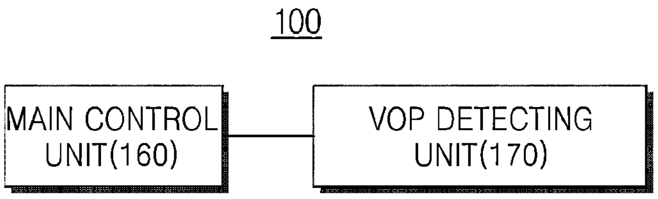
FIG. 3 is a block diagram illustrating a configuration added to the noise eliminating device of FIG. 1.
Figure 3:
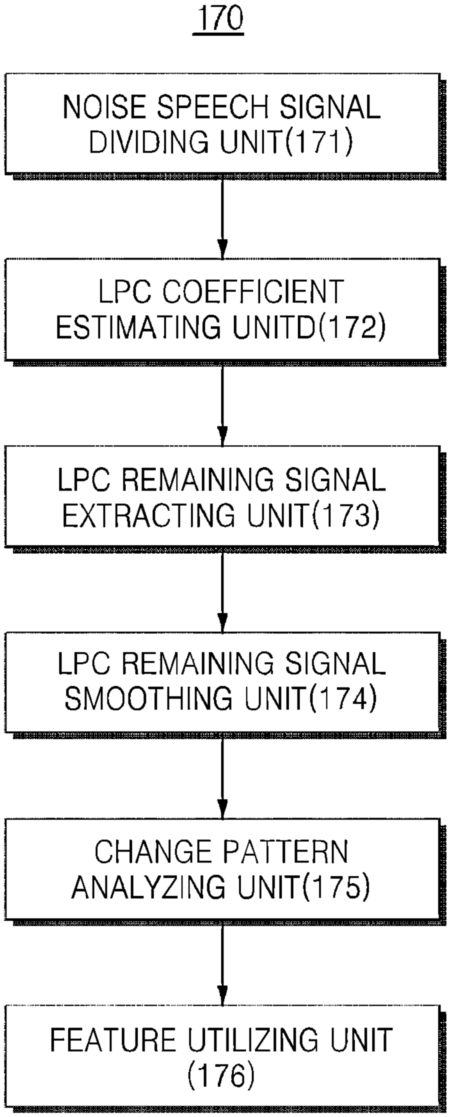

FIG. 3 is a block diagram illustrating a configuration added to the noise eliminating apparatus of FIG. 1. FIG. 3A is a configuration added to the noise eliminating apparatus 100, and illustrates a VOP detecting unit 170. The VOP detecting unit 170 performs a function for analyzing a change pattern of a LPC remaining signal and detecting a VOP.

FIG. 3B is a view illustrating a configuration of the VOP detecting unit 170. Referring to FIG. 3(*b*), the VOP detecting unit 170 includes a noise speech signal dividing unit 171, an LPC coefficient estimating unit 172, an LPC remaining signal extracting unit 173, an LPC remaining signal smoothing unit 174, a change pattern analyzing unit 175, and a feature utilizing unit 176.

The noise speech signal dividing unit 171 performs a function for dividing a noise speech signal into overlapping signal frames. The LPC coefficient estimating unit 172 performs a function for estimating an LPC coefficient on the basis of autocorrelation according to signal frames. The LPC remaining signal extracting unit 173 performs a function for extracting an LPC remaining signal on the basis of the LPC coefficient. The LPC remaining signal smoothing unit 174 performs a function for smoothing the extracted LPC remaining signal. The change pattern analyzing unit 175 performs a function for analyzing a change pattern of the smoothed LPC remaining signal and extracts a feature corresponding to a predetermined condition. The feature utilizing unit 176 performs a function for detecting a VOP on the basis of the feature.

Hereinafter, description will be made with reference to FIG. 7.

An LPC model is a representative technique used for human vocal tract modeling. Accordingly, an LPC coefficient estimation is possible through the selection of a proper LPC degree, and an LPC remaining signal may conserve most of a speech excitation signal. The present invention detects an initial consonant section through a method of detecting a VOP by analyzing a change pattern of an LPC remaining signal. A first operation of an LPC remaining signal based VOP detection is to extract an LPC remaining signal in LP analysis 420. An LPC is a representative method used for speech signal analysis, and provides a human vocal tract modeling by designing a time-varying filter using an LPC coefficient. At this point, a transfer function of an LPC coefficient based time-varying filter may be expressed through Equation 12.

$$H(z) = \frac{G}{1 - \sum_{j=1}^{p} a_j 2^{-i}} = \frac{G}{A(z)} \quad \text{[Equation 12]}$$

Here, G is a parameter for compensating an energy of an input signal. p and $a_j$ represent an LPC analysis degree and an ideal j-th LPC coefficient, respectively. When a transfer function of Equation 12 is expressed in a time zone, it may be represented through an LPC degree equation as shown in Equation 13.

$$s(n) = \sum_{j=1}^{p} a_j s(n-j) + Gu(n) \quad \text{[Equation 13]}$$

Here, u(n) represents an excitation signal. When a predicted value of an ideal LPC coefficient $a_j$ is expressed with $a_j$, an error of an actual value and the predicted value, i.e. an LPC remaining signal, is obtained through Equation 14.

$$e(n) = s(n) - \sum_{j=1}^{p} a_j s(n-j) \quad \text{[Equation 14]}$$

Based on Equation 14, when a predicted error is represented with Mean Squared Error (MSE), it is as follows.

$$E[e^2(n)] = E\left[\left(s(n) - \sum_{j=1}^{p} a_j s(n-j)\right)^2\right] \quad \text{[Equation 15]}$$

In order to minimize E of Equation 15, $a_j$ that makes each error orthogonal to each sample s(n−j) needs to be estimated. This is expressed through Equation 16.

$$\sum_{j=1}^{p} \alpha_j \Phi_n(i, j) = \Phi_n(i, 0),\ 1 \le i \le p \quad \text{[Equation 16]}$$

Here, Fn(i,j)=E[s(n−i)s(n−j)]. The present invention uses Equation 16 in order to estimate an LPC coefficient $a_j$. Equation 16 relates to an autocorrelation based method. The LPC coefficient of degree 10 is estimated by dividing an input speech into a frame of approximately 20 nm size overlapped by approximately 10 nm. On the basis of the estimated LPC coefficient, an LPC remaining signal is obtained using Equation 14.

Next, a process for smoothness on the basis of an LPC remaining signal is expressed with Equation 17 in envelope/smoothing 421. Equation 17 is as follows.

$$E_t(n)=h_1(n)*|e_t(n)| \quad \text{[Equation 17]}$$

Here, $E_t(n)$ is an n-th sample of a smooth envelope at the t-th frame obtained through Equation 17, and $h_1(n)$ represents a hamming window having the length of approximately 50 ms. That is, the length of 800 samples is given in a 16 kHz environment. $e_t(n)$ represents an n-th sample of an LPC remaining signal at the t-th frame obtained from Equation 14. A change of an excitation signal may be further easily detected through a smoothing process, and the present invention regards the smoothed LPC remaining signal $E_t(n)$ as the energy of an excitation signal in order to detect a VOP in FOD 422 and peak picking 423.

Since a change of Et(n) drastically occurs at the VOP, the variance of Et(n) becomes the maximum. Accordingly, the VOP may be detected through the slope of Et(n). Thus, by obtaining First-Order Difference (FOD) of Et(n) in operation 422, peak, i.e. the maximum value, is obtained in order to detect the VOP in operation 423. However, various changes in an excitation signal may occur during speech vocalization, and due to this, an unwanted FOD peak may be detected. Accordingly, like the smoothing process of an LPC remaining signal, a smoothing process is performed through Equation 18.

$$D_t(n)=h_2(n)*E_t(n) \quad \text{[Equation 18]}$$

Here, $D_t(n)$ represents an n-th sample of an FOD value of $E_t(n)$ smoothed at the t-th frame, and $h_2(n)$ is a hamming window having the same 20 nm length as the frame and has the length of 320 samples when being sampled into approximately 16 kHz.

Figure 8:
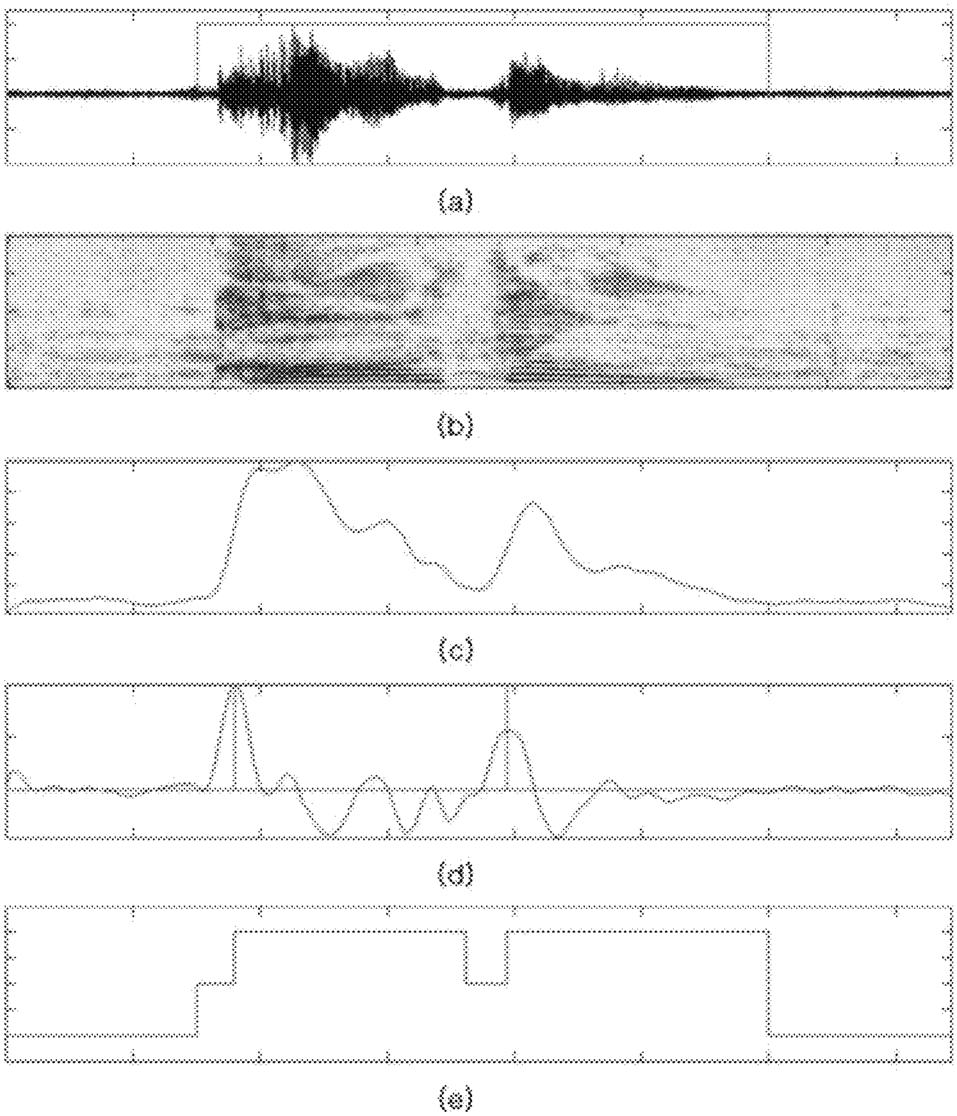
FIG. 8 is a view illustrating a VOP detecting process.

FIG. 8 is a view illustrating a VOP detecting process. FIG. 8A illustrates a speech waveform and speech section information, and FIG. 8B illustrates a spectrogram. FIG. 8C illustrates an excitation signal energy and FIG. 8D illustrates the first degree differential coefficient of a smoothed excitation signal. FIG. 8E illustrates speech section information including consonant/vowel classification.

FIG. 8 is a view illustrating a VOP detecting process with respect to the speech /reject/. FIG. 8A shows a speech waveform of /reject/, and especially, the red line of FIG. 8A represents a Gaussian model based speech detection result. FIG. 8B shows the spectrogram of /reject/. FIG. 8C shows the energy of an excitation signal, i.e. the smoothed LPC remaining signal Et(n). As shown in FIG. 8, at the onset point of the vowel /ㅓ/ of the first syllable and the onset point of the vowel /ㅓ/ of the second syllable, it is observed that the energy of an excitation signal drastically changes. In FIG. 8D, a peak value of this waveform may be regarded as a potential VOP through the FOD value Dt(n) of FIG. 8C. However, as shown in FIG. 8, it is observed that a peak value is found at the position of the vowel /ㅓ/ of two syllables, i.e. the actual VOP, and a change section of another excitation signal. At this point, the actual VOP is relatively greater than other peak values, and only one VOP exists in a predetermined section. In the present invention, a peak value of less than approximately 0.5 is regarded as an excitation signal change section at the normalized FOD. When at least two VOPs exist in a predetermined section, i.e. the length of 10 frames, the largest value among VOPs in a corresponding section is regarded as an actual VOP. The red vertical line of FIG. 8(*d*) shows a VOP detected by applying the rule.

Figure 4:
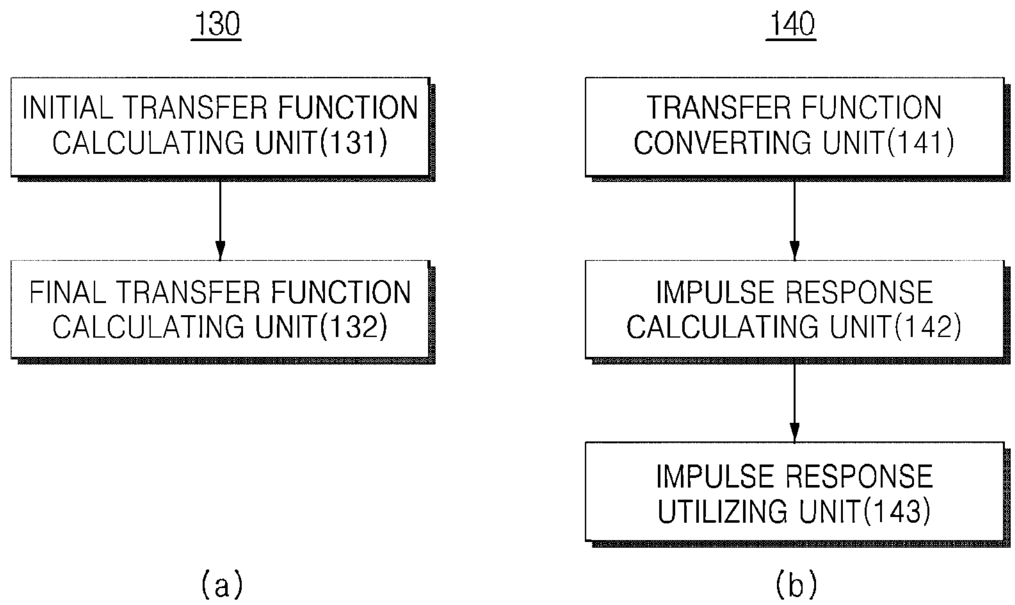
FIG. 4 is a block diagram illustrating a filter transfer function calculation unit and a noise eliminating unit in the noise eliminating apparatus of FIG. 1.
Figure 5:
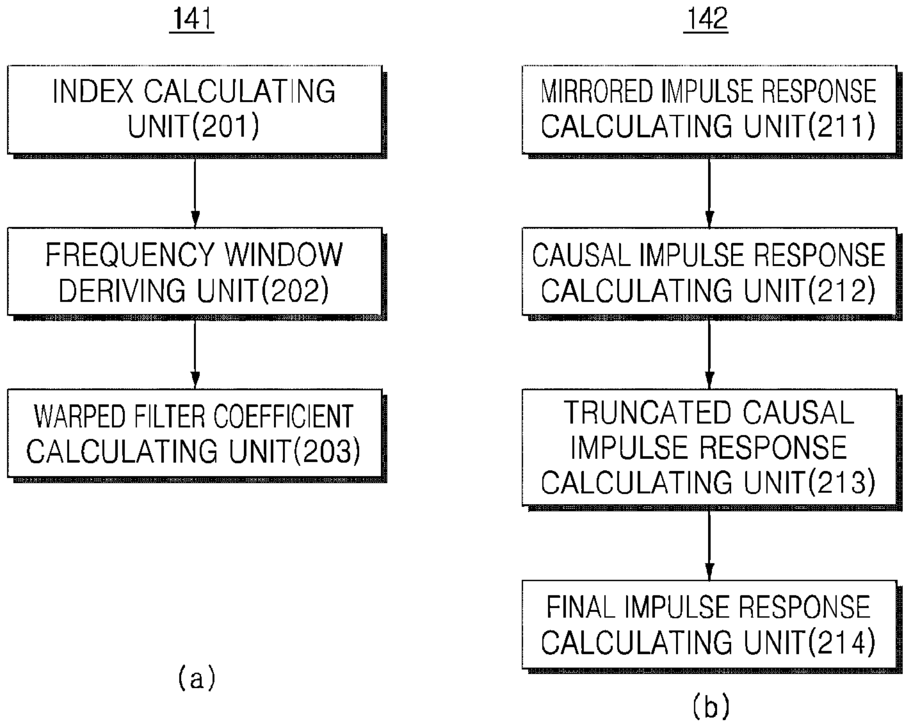
FIG. 5 is a block diagram illustrating a transfer function converting unit and an impulse response calculating unit in the noise eliminating apparatus of FIG. 4.

FIG. 4 is a block diagram illustrating a filter transfer function calculation unit and a noise eliminating unit in the noise eliminating apparatus of FIG. 1. FIG. 4A is a view illustrating a configuration of the filter transfer calculating unit 130. FIG. 4B is a view illustrating a configuration of the noise eliminating unit 140. FIG. 5 is a block diagram illustrating a transfer function converting unit and an impulse response calculating unit in the noise eliminating apparatus of FIG. 4. FIG. 5A is a view illustrating a configuration of the transfer function converting unit 141. FIG. 5B is a view illustrating a configuration of the impulse response calculating unit 142.

Referring to FIG. 4A, the filter transfer function calculating unit 130 includes an initial transfer function calculating unit 131 and a final transfer function calculating unit 132. The initial transfer function calculating unit 131 performs a function for calculating an initial transfer function by estimating a priori SNR at a current signal frame, when calculating the initial transfer function by using the current signal frame extracted from a noise speech signal. The final transfer function calculating unit 132 performs a function for calculating a final transfer function as a transfer function of the filter by updating a previously-calculated transfer function in consideration of a critical value according to whether a corresponding signal frame corresponds to which one of a consonant section, a vowel section, and a non-speech section, when calculating the final transfer function by using at least one signal frame after the current signal frame.

According to FIG. 4B, the noise eliminating unit 140 includes a transfer function converting unit 141, an impulse response calculating unit 142, and an impulse response utilizing unit 143. The transfer function converting unit 141 performs a function for converting a transfer function in order to correspond to an extraction condition used for extracting a predetermined level feature. The impulse response calculating unit 142 performs a function for calculating an impulse response in a time zone with respect to the converted transfer function. The impulse response utilizing unit 143 performs a function for eliminating a noise signal from a noise speech signal by using the impulse response.

According to FIG. 5A, the transfer function converting unit 141 includes an index calculating unit 201, a frequency window driving unit, and a warped filter coefficient calculating unit 203. The index calculating unit 201 performs a function for calculating indices corresponding to a central frequency at each frequency band included in a noise speech signal. The frequency window deriving unit 202 performs a function for deriving frequency windows under a first condition predetermined at each frequency band on the basis of the indices. The warped filter coefficient calculating unit 203 calculates a warped filter coefficient under a second condition predetermined based on the frequency windows.

Referring to FIG. 5B, the impulse response calculating unit 142 includes a mirrored impulse response calculating unit 211, a causal impulse response calculating unit 212, a truncated causal impulse response calculating unit 213, and a final impulse response calculating unit 214. The mirrored impulse response calculating unit 211 performs a function for calculating a mirrored impulse response through number-expansion on an initial impulse response obtained using a warped filter coefficient. The causal impulse response calculating unit 212 performs a function for calculating a mirrored impulse response based causal impulse response on the basis of a frequency band number relating to extraction reference. The truncated causal impulse response calculating unit 213 performs a function for calculating a truncated causal impulse response on the basis of the causal impulse response. The final impulse response calculating unit 214 performs a function for calculating an impulse response in a time zone as a final impulse response on the basis of the truncated causal impulse response and a Hanning window.

Figure 9:
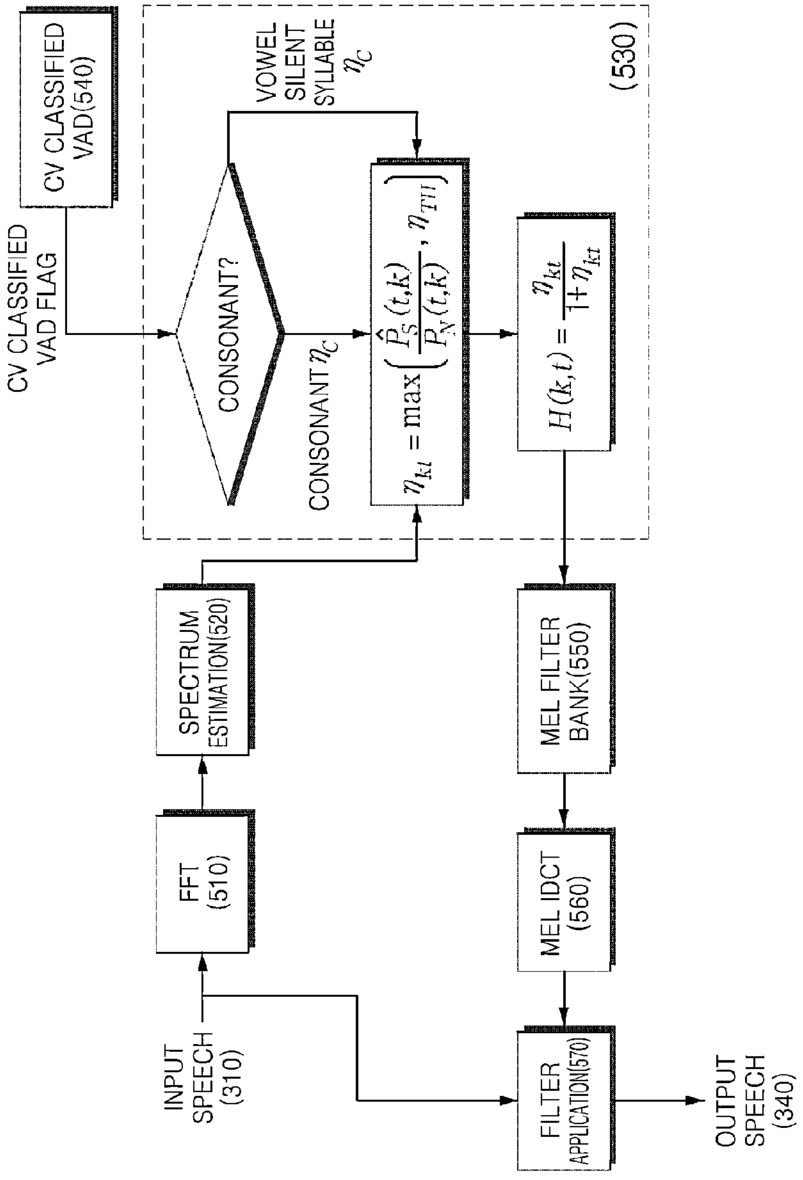
FIG. 9 is a block diagram illustrating the consonant/vowel dependent wiener filter of FIG. 6.

FIG. 9 is a block diagram illustrating the consonant/vowel dependent wiener filter of FIG. 6. Hereinafter, description will be made with reference to FIG. 9.

The consonant/vowel dependent wiener filter suggested from the present invention minimizes noise distortion, especially, initial consonant distortion, which is caused by noise processing in a consonant section. Accordingly, an initial consonant section needs to be detected based on the VOP. For this, a VOP previous predetermined section is set to a consonant section. In the present invention, 10 frames before the VOP, i.e. 1600 samples, are set to an initial consonant section through an experimental method, and then a VAD flag obtained from a VAD module is modified through Equation 19.

$$VAD'(t) = \begin{cases} 0 & \text{if } VAD(t) = 0 \\ 1 & \text{if } VAD(t) = 1 \text{ and } t \in I_{vop} \\ 2 & \text{otherwise} \end{cases} \quad \text{[Equation 19]}$$

where Ivop={[VOP(i)−e, VOP(i)]|i=1, . . . , M}. VOP(i) represents ith VOP and represents the total number of VOPs in utterance). e is assumed as 10 when considering an average duration time of consonants in pronunciation difficulty.

A silent section, an initial consonant section, and other sections including a vowel section have 0, 1, and 2, respectively. A result obtained through Equation 19 represents a consonant/vowel classified speech section information VAD'(t). This is a base for designing a transfer function of a consonant/vowel section dependent wiener filter. VAD(t) represents a VAD flag.

FIG. 9 is a view illustrating a configuration of a consonant/vowel dependent wiener filter having consonant/vowel section classified speech section information applied. A first operation 510 and 520 obtains a spectrum from an input speech signal 310. For this, as shown in Equation 20, a Hanning window is applied to the input signal 310, and then, the input signal 310 is divided into frames overlapped by approximately 10 ms, each having an approximately 20 ms size in FFT 510.

$$x_{w,t}(n) = x_y(n) \cdot w_{han}(n) \quad \text{[Equation 20]}$$

where $w_{han}(n)$ is a Hanning window having the length of N samples and $W_{han}(n)=0.5-0.5\cos(2p(n+0.5)/N)$. Additionally, N has the value of 320 corresponding to approximately 20 nm in a 16 kHz sample rate. t represents a frame index.

Then, in order to obtain spectrum, $X_{k,t}$ is obtained by FFT of $N_{FFT}$ length to $x_{w,t}(n)$, in order to obtain power spectrum through Equation 21 in Spectrum Estimation 520.

$$P(k,t) = X_{k,t} \cdot (X_{k,t})^*, \; 0 \le k \le N_{FFT}/2 \quad \text{[Equation 21]}$$

where * represents a complex conjugate, and $N_{FFT}$ has the value of 512. Also, a power spectrum P(k,t) is smoothed as follows, and due to the smoothing, the length of a power spectrum is reduced to $NS=N_{FFF}/4+1$.

$$P_S(k, t) = \begin{cases} \dfrac{P(2k, t) + P(2k+1, t)}{2}, & 0 \le k < N_S - 1 \\ P(2k), & k = N_S - 1 \end{cases} \quad \text{[Equation 22]}$$

The smoothed spectrum obtained through Equation 22 obtains an average spectrum obtained by averaging the $T_{PSD}$ number of frames through Equation 23.

$$P_M(k, t) = \frac{1}{T_{PSD}} \sum_{i=0}^{T_{PD}-1} P_S(k, t-i) \quad \text{[Equation 23]}$$

where $T_{PSD}$ is the number of frames considered in an average spectrum calculation, and is set to 2 in the present invention.

The next operation 530 of a consonant/vowel dependent wiener filter is to obtain a wiener filter coefficient proper for each consonant/vowel section by using the average spectrum $P_M(k,t)$ finally obtained from a spectrum calculation. In order to obtain a wiener filter coefficient, like a Gaussian model based speech section detecting method, a priori SNR needs to be estimated. For this, a noise spectrum is obtained through Equation 24.

$$P_N(k, t_N) = \begin{cases} \varepsilon P_N(k, t_N - 1) + (1-\varepsilon) P_M(k, t), & \text{if } VAD'(t) = 0 \\ P_N(k, t_N - 1) & \text{otherwise} \end{cases} \quad \text{[Equation 24]}$$

$$P_N(k, t) = P_N(k, t_N)$$

where VAD'(t) is the speech section information of t-th frame obtained through the consonant/vowel classification speech section detecting module, and $t_N$ represents the index of a previous silent frame. That is, if a current frame is a silent section, the noise spectrum of the current is updated by using the noise spectrum obtained from a right before frame and the spectrum of the current frame. If the current frame is a speech section, the noise spectrum is not updated. Additionally, e is a forgetting factor for updating a noise spectrum and is obtained through Equation 25.

$$\varepsilon = \begin{cases} 1 - 1/t, & \text{if } t < 100 \\ 0.99, & \text{otherwise} \end{cases}$$ [Equation 25]

The present invention estimates a priori SNR by applying a Decision-Directed (DD) method, and based on this, a wiener filter coefficient is obtained at each frame. A Priori SNR is obtained through Equation 26.

$$\eta'_{k,t} = \alpha \frac{\hat{P}_S(k, t-1)}{P_N(k, t-1)} + (1-\alpha)T[\gamma_{k,t} - 1]$$ [Equation 26]

where $\lambda_{k,t}$ represents the k-th frequency and the posteriori SNR at the k-th frame, and $\lambda_{k,t}=P_M(k,t)/P_N(k,t)$. $P^{\wedge}_S(k,t-1)$. $P^{\wedge}_S(k,t-1)$ represents a spectrum, i.e. a spectrum having noise removed, for a speech signal obtained by applying the obtained final wiener filter transfer function. Additionally, T[x] is a threshold function. If x=0, T[x]=x; if not, T[x]=0. H(k,t) is obtained through Equation 27 on the basis of the priori SNR obtained through Equation 26.

$$H(k, t) = \frac{\eta'_{k,t}}{1 + \eta'_{k,t}}$$ [Equation 27]

In order to an improved transfer function again, the transfer function H(k,t) of the wiener filter is applied to obtain the estimation value of the spectrum having noise removed as shown in Equation 28.

$$\hat{P}_S(k,t)=H(k,t)P_M(k,t)$$ [Equation 28]

The estimation value of the improved speech spectrum is used for obtaining the priori SNR which is improved to obtain the final transfer function of the wiener filter with respect to the t-th frame. The final transfer function is obtained differently according to a rule for each consonant/vowel section.

$$\eta_{k,t} = \max\left(\frac{\hat{P}_S(k, t)}{P_N(k, t)}, \eta_{TH}\right)$$ [Equation 29]

where $\rho_{TH}$ is the threshold value of a priori SNR. In order to prevent the speech signal of a consonant section from being distorted and damaged during a wiener filter applying process, the present invention applies different threshold values to a consonant section and a vowel section as shown in Equation 30.

$$\eta_{TH} = \begin{cases} \eta_C, & \text{if } VAD'(t) = 1 \\ \eta_V, & \text{otherwise} \end{cases}$$ [Equation 30]

That is, the threshold value $\rho_C$ is applied to a consonant section and $\rho_V$ is applied to a vowel section and a silent section. In the present invention, $\rho_C$ and $\rho_V$ are set to 0.25 and 0.075, respectively, through an experimental method. Due to this, the degree of noise elimination is set to be weaker in a consonant section than a vowel section and a silent section. Then, the final transfer function H(k,t) of the wiener filter is obtained by using the improved priori SNR through Equation 27. In order to calculate the initial priori SNR at the t+1th frame, $P^{\wedge}_S(k,t)$ is updated through Equation 28 on the basis of final H(k,t).

A noise eliminating algorithm performed in a frequency area such as spectral subtraction and the wiener filter has musical noise generation. Accordingly, after the wiener filter transfer function according to a consonant/vowel section is converted into a mel-frequency scale through a Mel Filter Bank 550, an impulse response is obtained in a time zone through Inverse Discrete Cosine Transform (IDCT), especially, Mel IDCT 560. First, a mel-warped wiener filter coefficient Hmel(b,t) is obtained by applying a frequency window having a half-overlapping triangular shape. In order to obtain the central frequency of each filter bank, a linear frequency scale flin is converted into a mel-scale through Equation 31.

$$MEL\{f_{lin}\}=2595\cdot\log_{10}(1+f_{lin}/700)$$ [Equation 31]

Then, the central frequency fc(b) of the b-th band is calculated through Equation 32.

$$f_c(b)=700(10^{f_{mel}(b)/2595}-1 \le b \le B$$ [Equation 32]

where B has 23.

$$f_{mel}(b) = b\frac{MEL\{f_s/2\}}{B+1}$$ [Equation 33]

where fs is a sampling frequency and is set to approximately 16,000 Hz. Additionally, two extra filter bank bands having central frequency fc(0)=0 and fc(B+1)=fs/2 are added to 23 mel-filter banks. This is for DCT conversion to the next time zone. Accordingly, total 25 mel-warped wiener filter coefficients are obtained.

Then, an FFT bin index corresponding to the central frequency fc(b) is obtained as follows.

$$k_{f_c}(b) = R\left(2(N_S - 1)\frac{f_c(b)}{f_s}\right)$$ [Equation 34]

where R(•) represents a round function. A frequency window W(b,k) is derived at 1=b=B on the basis of FFT bin indices corresponding to each central frequency.

$$W(b, k) = \begin{cases} \dfrac{k - k_{f_c}(b-1)}{k_{f_c}(b) - k_{f_c}(b-1)}, & k_{f_c}(b-1) + 1 \le k \le k_{f_c}(b) \\ 1 - \dfrac{k - k_{f_c}(b)}{k_{f_c}(b+1) - k_{f_c}(b)}, & k_{f_c}(b) + 1 \le k \le k_{f_c}(b+1) \end{cases}$$ [Equation 35]

Here, when k=0 and k=B+1, each is as follows.

$$W(0, k) = 1 - \frac{k}{k_{f_c}(1) - k_{f_c}(b)}, \quad 0 \le k \le k_{f_c}(1) - k_{f_c}(0) - 1$$
$$W(B+1, k) = \frac{k - k_{f_c}(B)}{k_{f_c}(B+1) - k_{f_c}(B)}, \quad k_{f_c}(B) + 1 \le k \le k_{f_c}(B+1)$$ [Equation 36]

On the basis of frequency windows for 25 bands, a mel-warped wiener filter coefficient Hmel(b,t) with respect to 0=b=B+1 is obtained as follows.

[Equation 37]

$$H_{mel}(b,t)=\frac{\sum_{k=0}^{N_S-1}W(b,k)H(k,t)}{\sum_{k=0}^{N_S-1}W(b,k)}$$

A wiener filter impulse response in a time zone is obtained as follows by using the mel-warped IDCT obtained from the mel-warped wiener filter coefficient Hmel(b,t).

[Equation 38]

$$h_t(n)=\sum_{b=1}^{B+1}H_{mel}(b)IDCT_{mel}(b,n),$$
$$0\le n\le B+1$$

where $IDCT_{mel}(b,n)$ is the basis of mel-warped IDCT, and is derived through the following process. First, the central frequency of each band for 1=b=B is obtained.

[Equation 39]

$$f_c(b)=\frac{\sum_{k=0}^{N_S-1}W(b,k)\frac{k\cdot f_s}{2(N_S-1)}}{\sum_{k=0}^{N_S-1}W(b,k)}$$

where fs is a sampling frequency and is approximately 16,000 Hz. fc(0) is 0, and fc(B+1) is fs/2. Then, mel-warped IDCT bases are calculated.

[Equation 40]

$$IDCT_{mel}(b,n)=\cos\left(\frac{2\pi nf_c(b)}{f_s}\right)df(b),$$
$$1\le b\le B+1,$$
$$0\le n\le B+1$$

where df(b) is a function defined as follows.

[Equation 41]

$$df(b)=\begin{cases}\frac{f_c(1)-f_c(0)}{f_s}, & b=0\\ \frac{f_c(b+1)-f_c(b-1)}{f_s}, & 1\le b\le B\\ \frac{f_c(B+1)-f_c(B)}{f_s}, & b=B+1\end{cases}$$

The impulse response $h_t(n)$ of the wiener filter undergoes the following process before it is finally applied to an input noise speech in Filter Applying 570.

[Equation 42]

$$h_{mirr,t}(n)=\begin{cases}h_t(n), & 0\le n\le B+1\\ h_t(2(B+1)+1-n), & B+2\le n\le 2(B+1)\end{cases}$$

The above Equation is a mirroring process for expanding the impulse response of the B+1 wiener filters into that of the 2(B+1) wiener filters. A truncated causal impulse response is obtained from the given mirrored impulse response through the following Equation 43.

[Equation 43]

$$h_{c,t}(n)=\begin{cases}h_{mirr,t}(n+B+1), & 0\le n\le B\\ h_{mirr,t}(n-B), & B+1\le n\le 2(B+1)\end{cases}$$

$$h_{trunc,t}(n)=h_{c,t}(n+B+1-(N_F-1)/2),$$
$$0\le n\le N_F-1$$

where $h_{c,t}(n)$ represents a causal impulse response and htrunc,t(n) represents a truncated causal impulse response. NF is the filter length of a final impulse response and is set to 17 in the present invention. The truncated impulse response is multiplied by a Hanning window.

[Equation 44]

$$h_{WF,t}(n)=\left\{0.5-0.5\cos\left(\frac{2\pi(n+0.5)}{N_F}\right)\right\}h_{trunc,t}(n),$$
$$0\le n\le N_F-1$$

The final output speech $\hat{s}_t(n)$ having noise removed is obtained as follows by applying the impulse response $h_{WF,t}(n)$ of the wiener filter to the input noise speech xt(n).

[Equation 45]

$$\hat{s}_t(n)=\sum_{i=-\frac{N_F-1}{2}}^{\frac{N_F-1}{2}}h_{WF,t}(i+(N_F-1)/2)\cdot x_t(n-i),$$
$$0\le n\le N-1$$

Figure 10:
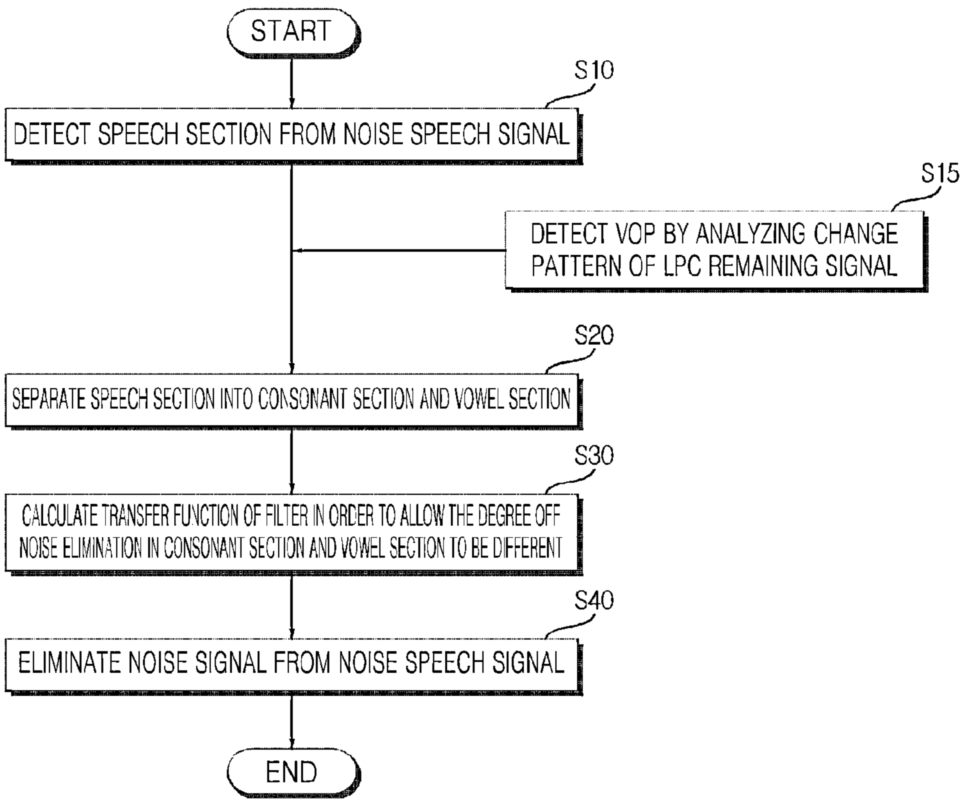
FIG. 10 is a flowchart illustrating a method of eliminating noise in accordance with an exemplary embodiment of the present invention.

Then, a method of eliminating noise will be described by using the noise eliminating apparatus shown in FIGS. 1 to 5. FIG. 10 is a flowchart illustrating a method of eliminating noise in accordance with an exemplary embodiment of the present invention. Hereinafter, description will be made with reference to FIG. 10.

First, the speech section detecting unit 110 detects a speech section from a noise speech signal including a noise signal in speech section detecting operation S10. At this point, the speech section detecting unit 110 compares a likelihood ratio of a speech probability to a non-speech probability in a first frequency with a speech section feature average value in at least two frequencies including the first frequency at each signal frame divided from a noise speech signal, in order to detect a speech section.

Speech section detecting operation S10 may be specified as follows. First, the SNR calculating unit 111 calculates a posteriori SNR by using a frequency component in the first signal frame. The priori SNR estimating unit 112 estimates a priori SNR by using at least one of the spectrum density of a noise signal at the second signal frame prior to the first signal frame, the spectrum density of a speech signal in the second signal frame, and the posteriori SNR. Then, the likelihood ratio calculating unit 113 calculates a likelihood ratio with respect to each frequency included in at least two frequencies by using the posteriori SNR and the priori SNR. Then, the speech section feature value calculating unit 114 calculates a speech section feature average value by averaging the sum of likelihood ratios for each frequency. Then, the speech section determining unit 115 determines the first signal frame as the speech section when one side component including a likelihood ratio with respect to a first frequency is greater than the other side component including a speech section feature average value through an equation that uses the likelihood ratio with respect to a first frequency and the speech section feature average value as a factor.

After speech section detecting operation S10, the speech section separating unit 120 separates a speech section into a consonant section and a vowel section on the basis of a VOP in the speech section in speech section separating operation S20.

After speech section separating operation S20, the filter transfer function calculating unit 130 calculates a transfer function of a filter to eliminate a noise signal in order to make the degree of noise elimination in a consonant section and a vowel section different in filter transfer function calculating operation S30. At this point, the filter transfer function calculating unit 130 calculates a transfer function that allows the degree of noise elimination in a consonant section to be less than that in a vowel section.

Filter transfer function calculating operation S30 may be specified as follows. First, the initial transfer function calculating unit 131 calculates an initial transfer function by estimating a priori SNR at a current signal frame when calculating the initial transfer function by using the current signal frame extracted from a noise speech signal. Then, the final transfer function calculating unit 132 calculates a final transfer function as a transfer function of the filter by updating a previously-calculated transfer function in consideration of a critical value according to whether a corresponding signal frame corresponds to which one of a consonant section, a vowel section, and a non-speech section, when calculating the final transfer function by using at least one signal frame after the current signal frame.

After filter transfer function calculating operation S30, the noise signal is eliminated from the noise speech signal on the basis of the transfer function in noise eliminating operation S40.

Noise eliminating operation S40 may be specified as follows. First, the transfer function converting unit 141 converts a transfer function in order to correspond to an extraction condition used for extracting a predetermined level feature. Then, the impulse response calculating unit 142 calculates an impulse response in a time zone with respect to the converted transfer function. Then, the impulse response utilizing unit 143 eliminates a noise signal from a noise speech signal by using the impulse response in impulse response utilizing operation.

Transfer function converting operation may be specified as follows. First, the index calculating unit 201 calculates indices corresponding to a central frequency at each frequency band included in a noise speech signal. Then, the frequency window deriving unit 202 derives frequency windows under a first condition predetermined at each frequency band on the basis of the indices. Then, the warped filter coefficient calculating unit 203 calculates a warped filter coefficient under a second condition predetermined based on the frequency windows.

Impulse response calculating operation may be specified as follows. First, the mirrored impulse response calculating unit 211 calculates a mirrored impulse response through number-expansion on an initial impulse response obtained using a warped filter coefficient. Then, the causal impulse response calculating unit 212 calculates a mirrored impulse response based causal impulse response on the basis of a frequency band number relating to the above condition. Then, the truncated causal impulse response calculating unit 213 calculates a truncated causal impulse response on the basis of the causal impulse response. Then, the final impulse response calculating unit 214 calculates an impulse response in a time zone as a final impulse response on the basis of the truncated causal impulse response and a Hanning window.

VOD detecting operation S15 may be performed between speech section detecting operation S10 and speech section separating operation S20. VOP detecting operation S15 is performed by the VOD detecting unit 170 and analyzes a change pattern of an LPC remaining signal in order to detect a VOP.

VOP detecting operation S15 may be specified as follows. First, the noise speech signal dividing unit 171 divides a noise speech signal into overlapping signal frames. Then, the LPC coefficient estimating unit 172 estimates an LPC coefficient on the basis of autocorrelation according to signal frames. Then, the LPC remaining signal extracting unit 173 extracts an LPC remaining signal on the basis of the LPC coefficient. Then, the LPC remaining signal smoothing unit 174 smoothes the extracted LPC remaining signal. Then, the change pattern analyzing unit 175 analyzes a change pattern of the smoothed LPC remaining signal and extracts a feature corresponding to a predetermined condition. Then, the feature utilizing unit 176 detects a VOP on the basis of the feature.

The present invention relates to an apparatus and method for eliminating noise, and more particularly, to a consonant/vowel dependent wiener filter and a filtering method for speech recognition in a noisy environment. The present invention may be applied to a speech recognition field such as a personalized built-in speech recognition apparatus for vocalization handicapped person.

The present invention provides an apparatus and method for eliminating noise, which estimate noise components by detecting a speech section and a non-speech section and detect a consonant section and a vowel section from the speech section in order to apply a transfer function appropriate for each section. As a result, the following effects may be obtained. First, distortion in a consonant section may be minimized by preventing a phenomenon that a consonant section is eliminated together with noise. Second, speech recognition performance may be further improved in a noisy environment, compared to the wiener filter.

Although the apparatus and method for eliminating noise have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A noise eliminating apparatus comprising:

a speech section detecting unit configured to detect a speech section from a noise speech signal including a noise signal;

a speech section separating unit configured to separate the speech section into a consonant section and a vowel section on the basis of a Vowel Onset Point (VOP) in the speech section;

a filter transfer function calculating unit configured to calculate a transfer function of a filter for eliminating the noise signal in order to allow the degree of noise elimination in the consonant section and the vowel section to be different, wherein the filter transfer function calculating unit comprises an initial transfer function calculating unit and a final transfer function calculating unit, wherein the initial transfer function calculating unit is configured to calculate an initial transfer function by estimating the priori SNR at a current signal frame when calculating the initial transfer function by using the current signal frame extracted from a noise speech signal, and wherein the final transfer function calculating unit is configured to calculate a final transfer function as a transfer function of the filter by updating a previously-calculated transfer function in consideration of a critical value according to whether a corresponding signal frame corresponds to which one of the consonant section, the vowel section, and a non-speech section, when calculating the final transfer function by using at least one signal frame after the current signal frame; and a noise eliminating unit configured to eliminate the noise signal from the noise speech signal on the basis of the transfer function.

2. The apparatus of claim 1, wherein the filter transfer function calculating unit calculates the transfer function by allowing the degree of noise elimination in the consonant section to be less than that in the vowel section.

3. The apparatus of claim 1, wherein the speech section detecting unit compares a likelihood ratio of a speech probability to a non-speech probability in a first frequency with a speech section feature average value in at least two frequencies including the first frequency at each signal frame divided from the noise speech signal, in order to detect the speech section.

4. The apparatus of claim 3, wherein the speech section detecting unit comprises:

a posteriori Signal-to-Noise Ratio (SNR) calculating unit configured to calculate a posteriori SNR by using a frequency component in a first signal frame;

a priori SNR estimating unit configured to estimate a priori SNR by using at least one of the spectrum density of a noise signal at a second signal frame prior to the first signal frame, the spectrum density of a speech signal in the second signal frame, and the posteriori SNR;

a likelihood ratio calculating unit configured to calculate a likelihood ratio with respect to each frequency included in the at least two frequencies by using the posteriori SNR and the priori SNR;

a speech section feature value calculating unit configured to calculate the speech section feature average value by averaging the sum of likelihood ratios for each frequency; and a speech section determining unit configured to determine the first signal frame as the speech section when one side component including the likelihood ratio with respect to the first frequency is greater than the other side component including the speech section feature average value through an equation that uses the likelihood ratio with respect to the first frequency and the speech section feature average value as a factor.

5. The apparatus of claim 1, further comprising:

a VOP detecting unit configured to detect the VOP by analyzing a change pattern of a Linear Predictive Coding (LPC) remaining signal.

6. The apparatus of claim 5, wherein the VOP detecting unit comprises:

a noise speech signal dividing unit configured to divide the noise speech signal into overlapping signal frames;

an LPC coefficient estimating unit configured to estimate an LPC coefficient on the basis of autocorrelation according to the signal frames;

an LPC remaining signal extracting unit configured to extract the LPC remaining signal on the basis of the LPC coefficient;

an LPC remaining signal smoothing unit configured to smooth the extracted LPC remaining signal;

a change pattern analyzing unit configured to analyze a change pattern of a smoothed LPC remaining signal in order to extract a feature corresponding to a predetermined condition; and a feature utilizing unit configured to detect the VOP on the basis of the feature.

7. The apparatus of claim 1, wherein the noise eliminating apparatus comprises:

a transfer function converting unit configured to convert the transfer function in order to correspond to an extraction condition used for extracting a predetermined level feature;

an impulse response calculating configured to calculate an impulse response in a time zone with respect to the converted transfer function; and an impulse response utilizing unit configured to eliminate the noise signal from the noise speech signal by using the impulse response.

8. The apparatus of claim 7, wherein the transfer function converting unit comprises:

an index calculating unit configured to calculate indices corresponding to a central frequency at each frequency band included in the noise speech signal;

a frequency window deriving unit configured to derive frequency windows under a first condition predetermined at the each frequency band on the basis of the indices; and a warped filter coefficient calculating unit configured to calculate a warped filter coefficient under a second condition predetermined based on the frequency windows, and performing the conversion, and the impulse response calculating unit comprises:

a mirrored impulse response calculating unit configured to perform a number-expansion operation on an initial impulse response obtained using the warped filter coefficient in order to calculate a mirrored impulse response;

a causal impulse response calculating unit configured to calculate a causal impulse response based on the mirrored impulse response according to a frequency band number relating to the condition;

a truncated causal impulse response calculating unit configured to calculate a truncated causal impulse response on the basis of the causal impulse response; and a final impulse response calculating unit configured to calculate an impulse response in the time zone as a final impulse response on the basis of the truncated causal impulse response and a Hanning window.

9. The apparatus of claim 1, wherein the noise eliminating apparatus is used to recognize speech.

10. A method of eliminating noise, the method comprising:

detecting a speech section from a noise speech signal including a noise signal;

separating the speech section into a consonant section and a vowel section on the basis of a VOP at the speech section;

calculating a transfer function of a filter for eliminating the noise signal to allow the degree of noise elimination to be different in the consonant section and the vowel section, wherein calculating a transfer function comprises calculating an initial transfer function and calculating a final transfer function, wherein calculating the initial transfer function comprises estimating the priori SNR at a current signal frame when calculating the initial transfer function by using the current signal frame extracted from a noise speech signal, and wherein calculating the final transfer function comprises calculating a transfer function of the filter by updating a previously-calculated transfer function in consideration of a critical value according to whether a corresponding signal frame corresponds to which one of the consonant section, the vowel section, and a non-speech section, when calculating the final transfer function by using at least one signal frame after the current signal frame; and eliminating the noise signal from the noise speech signal on the basis of the transfer function.

11. The method of claim 10, wherein the calculating of the filter transfer function comprises calculating the transfer function by allowing the degree of noise elimination in the consonant section to be less than that in the vowel section.

12. The method of claim 10, wherein the detecting of the speech section comprises comparing a likelihood ratio of a speech probability to a non-speech probability in a first frequency with a speech section feature average value in at least two frequencies including the first frequency at each signal frame divided from the noise speech signal, in order to detect the speech section.

13. The method of claim 10, further comprising detecting the VOP by analyzing a change pattern of an LPC remaining signal.

14. The method of claim 10, wherein the removing of the noise comprises:

converting the transfer function in order to correspond to a standard used for extracting a predetermined level feature;

calculating an impulse response in a time zone with respect to the converted transfer function; and eliminating the noise signal from the noise speech signal by using the impulse response.

* * * * *